G. RENNERFELT & A. P. LUNDIN.
CRANES OR DAVITS.
APPLICATION FILED AUG. 24, 1906.
1,086,309.
Patented Feb. 3, 1914.
6 SHEETS—SHEET 4.
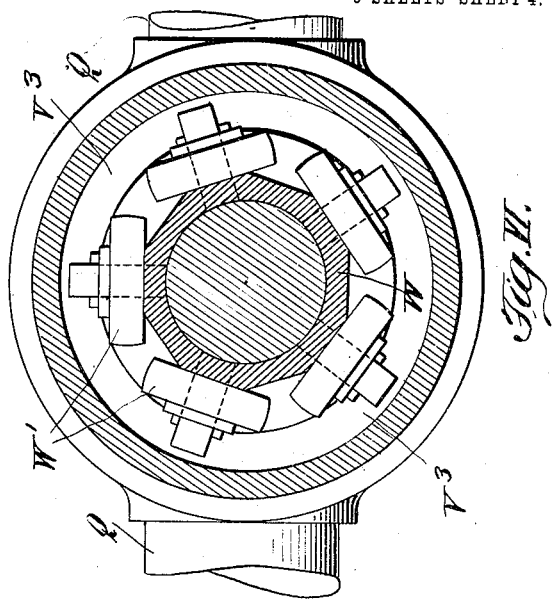
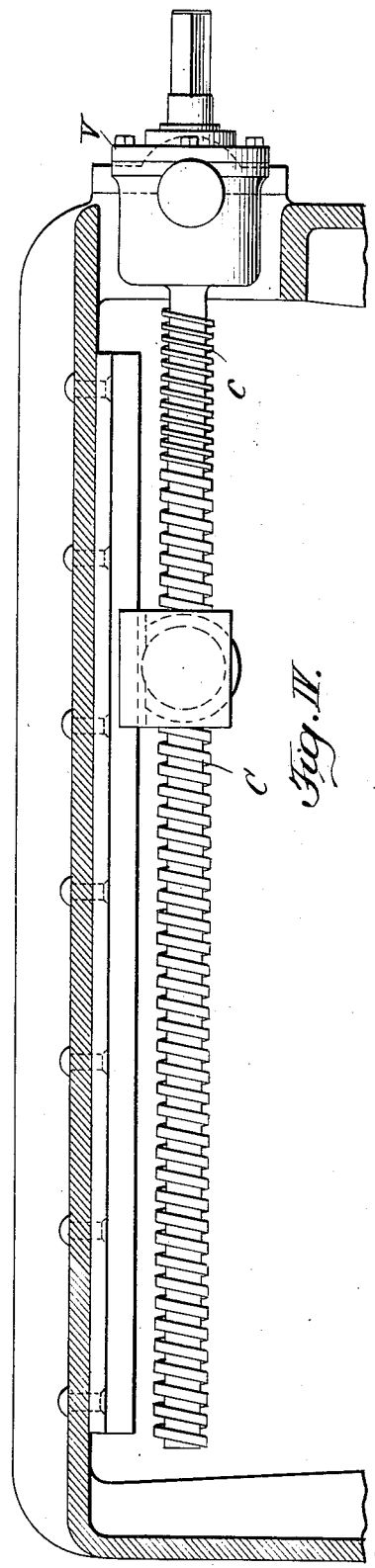
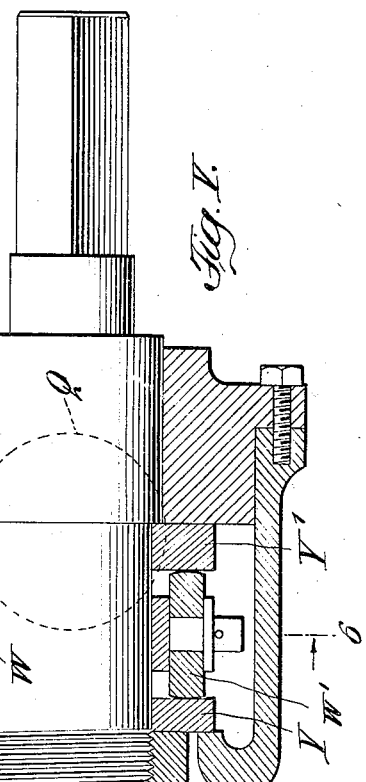

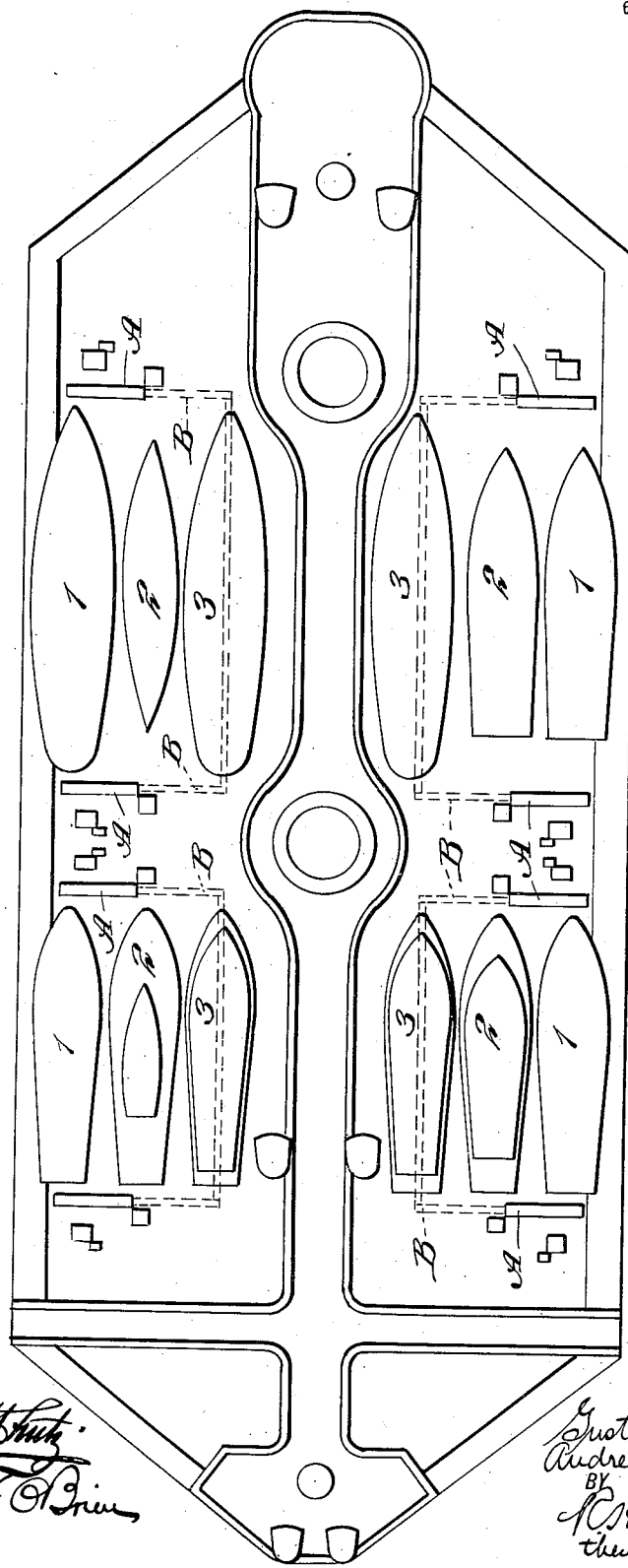

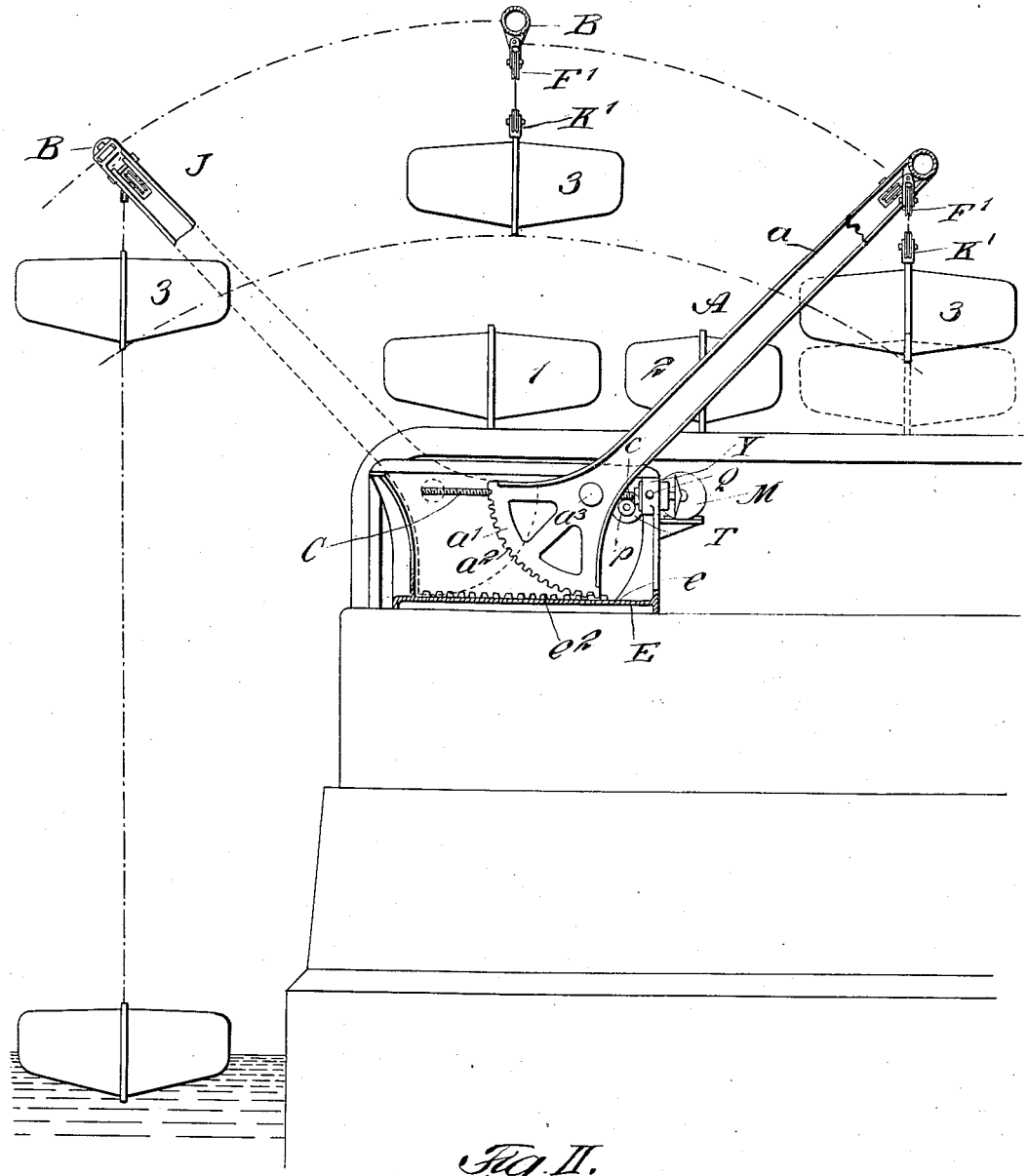
Fig. II.

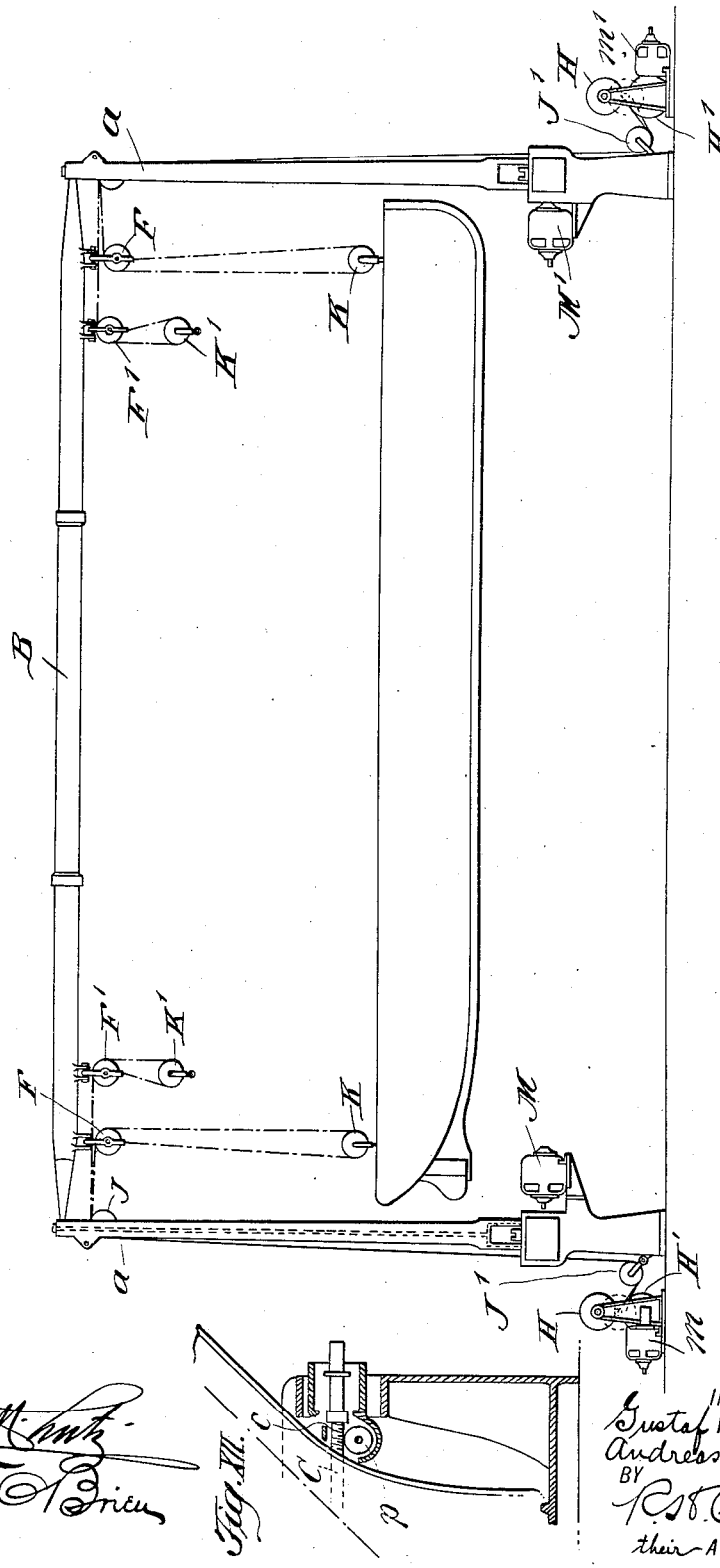

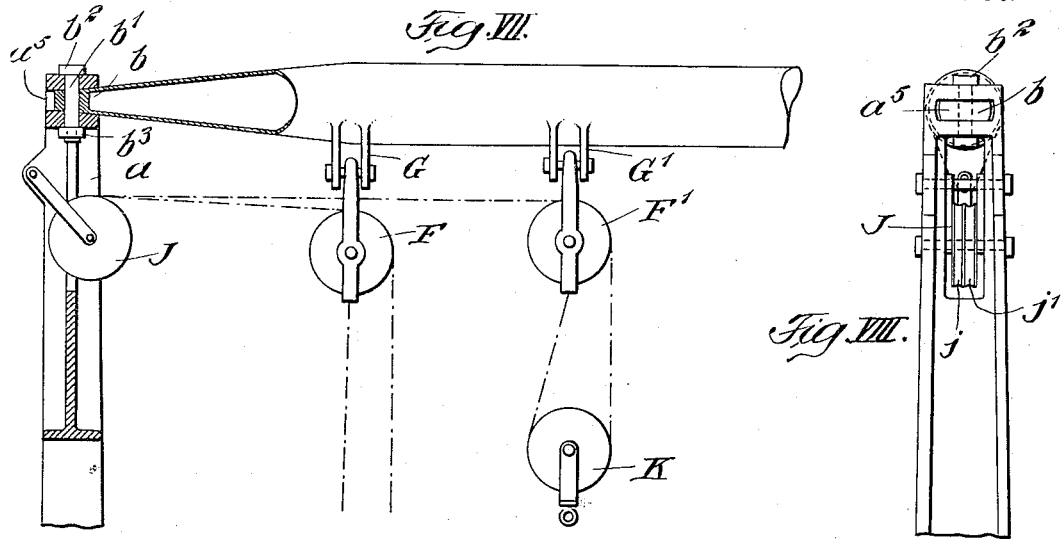
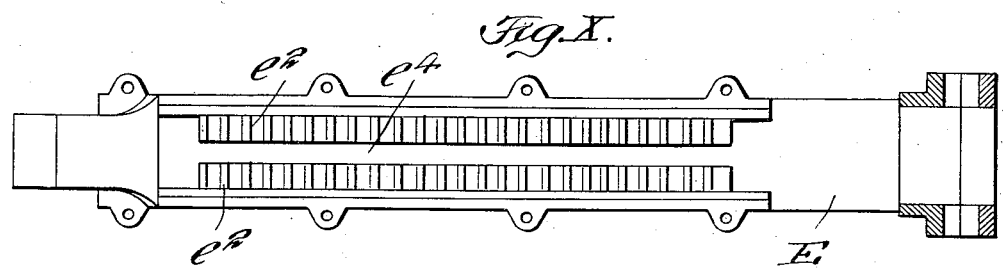
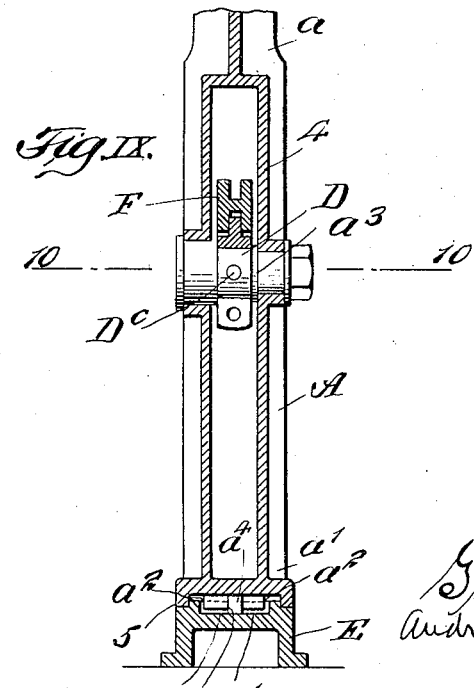

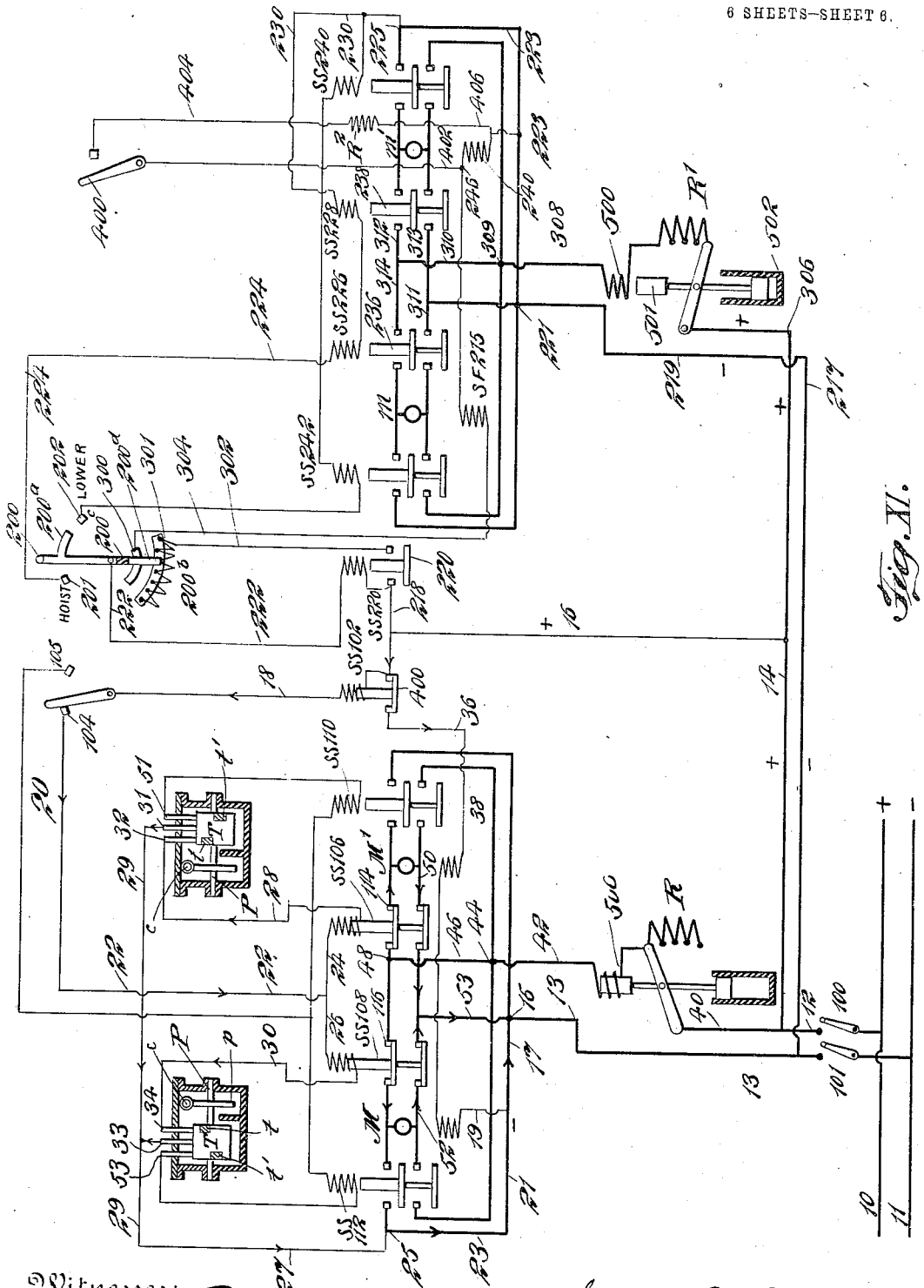

UNITED STATES PATENT OFFICE.

GUSTAF RENNERFELT AND ANDREAS P. LUNDIN, OF NEW YORK, N. Y., ASSIGNORS, BY MESNE ASSIGNMENTS, TO ASTOR TRUST COMPANY, TRUSTEE, A CORPORATION OF NEW YORK.

CRANES OR DAVITS.

1,086,309.   Specification of Letters Patent.   Patented Feb. 3, 1914.

Application filed August 24, 1908. Serial No. 449,969.

*To all whom it may concern:*

Be it known that we, GUSTAF RENNERFELT and ANDREAS P. LUNDIN, the said RENNERFELT a subject of the King of Sweden and the said LUNDIN a citizen of the United States, both being residents of the borough of Manhattan, city, county, and State of New York, have invented certain new and useful Improvements in Cranes or Davits, of which the following is a specification.

Our invention relates to improvements in davits and more particularly ships' davits for raising and lowering life boats, launches, etc.

It is especially well adapted for use on war ships and other vessels which carry boats of varying weights and some boats of considerable weight which it may be desired, not only to swing over one side of a vessel, but also to swing from one side to the other. Obviously, however, our invention may be utilized in either land or marine work wherever similar conditions exist or wherever it is desired to accomplish the results which can be accomplished by the use of this invention.

Broadly speaking, our invention may be useful under any circumstances where it is desired to handle loads of appreciably different weights or loads of considerable weight, to move a load from one point to a point a considerable distance away where it is necessary to raise and lower the same, or to pick up any one of a number of devices covering a considerable space and move them readily to another position.

In the accompanying drawings, we have shown the preferred form of our invention as we prefer to apply it to a war ship. In these drawings, similar reference characters designate corresponding parts.

Figure I is a plan view of a war ship, partially diagrammatic, illustrating one method of arranging our davits and intended primarily to indicate one set of conditions under which our invention would be peculiarly useful; Fig. II is an end elevation showing one davit and its method of operation; Fig. III is a side elevation of the same construction; Fig. IV is a detailed view of our preferred construction of the worm, nut and supporting and connecting parts for this construction; Fig. V is a more detailed view, partly in longitudinal section, illustrating the bearing for the worm; Fig. VI is a transverse sectional view through the line VI—VI, Fig. V; Fig. VII is a side view, partially in section, showing our preferred method of securing the boom to the davit arms, and also our preferred method of securing other parts to the beam and davit arms; Fig. VIII is an end view of the construction illustrated in Fig. VII; Fig. IX is a side view, partially in vertical cross-section of a davit arm and support therefor; Fig. X is a plan view of the form of davit supporting rack illustrated in Fig. IX; and Fig. XI is a diagrammatic view illustrating our preferred method of wiring and electric control of our preferred construction. Fig. XII is a detail view.

Referring now to Fig. I, it will be noted that we have shown on each side of a war ship eight boats running from forty-foot steam cutters of 18,700 pounds down to small dinghies. In practice, in view of the weight of these boats, the extent of space covered by them, so far as their length is concerned and when arranged end to end, and in view of the construction of the present day war ship and the arrangement of the boats carried by it, we prefer, in this particular embodiment, to employ two sets of davits, each set embodying our improvements, each set comprising two davits connected by a boom, and each davit embodying certain other of our improvements.

In Fig. I, we have diagrammatically indicated the location of the davits which are indicated in that figure, A, and the connecting booms, as shown in dotted lines, we have designated B. In Fig. I, we have marked merely the location of the various boats in each set 1, 2 and 3 commencing outboard and running inboard.

Turning to Fig. II, 1, 2 and 3 designate positions of the boats in any one set corresponding to the similar positions indicated in Fig. I. A again designates the davit. Turning now to a description of the davit, $a$ designates the davit arm proper, provided at its lower end with a segment $a'$ shown as provided with teeth $a^2$. As shown, the davit A is pivoted at $a^3$ to a nut D which, as will hereinafter be more fully described, travels on a worm C.

Turning for a moment to Figs. IX and X, E designates a rack suitably secured to the deck in any suitable manner and provided, as shown, with two sets of teeth $e^2$ $e^2$ separated by a space $e^4$. In Fig. IX, the upper surface of the teeth is indicated by the dotted line. As shown, again in Fig. IX, our preferred form, the lower segment $a'$ of the davit is supplied with two sets of teeth $a^2$ $a^2$ arranged on each side of a track $a^4$, which track projects down through the space $e^4$ between the teeth of the rack and rests upon the upper surface $e'$ of the central portion $e$ of the casting of the rack. It will be further noticed by referring to Figs. IX and X that the segment in addition to its intermediate track $a^4$ is provided with two outside tracks engaging with similar outside tracks arranged on the rack. Furthermore, whereas the intermediate track $a^4$ rolls along the normal plane of the casting or in other words, along the upper surface of the central portion $e^1$ of the rack, the outside tracks of the rack are raised and the outside tracks of the segment are shortened. This may be said to result in raising the pitch line. In other words, as shown, whereas the intermediate track $a^4$ extends to the bottom of the teeth $e^2$ $e^2$ the outside tracks of the segment are rolling along the plane, which substantially bisects the pitch of these teeth $e^2$ $e^2$. Still referring to Fig. IX, 4 designates the frame proper shown in cross-section, D the traveling nut, $Dc$ a threaded hole therein to permit the insertion of the worm on which the nut travels, and F a guide-plate secured at each end to the frame and adapted to guide the traveling nut laterally and at the same time to permit of sufficient play vertically. The rack and frame are preferably rigidly joined together in any suitable manner. The rack and frame may be cast integral as shown or separately and then bolted together, or both of the same may be bolted to the floor by the same bolts, thus securing the two parts to the floor or deck and also to each other.

Turning back to Fig. II, it will be seen that when the worm C is rotated in any manner, the traveling nut D will inevitably move along the same, outward or inward, depending upon the direction of rotation of the worm, and the davit will also be caused to swing around its pivot $a^3$ on account of the engagement of the teeth $a^2$ on its segment $a^1$ with the teeth $e^2$ of the rack E, the track $a^4$ rolling between the teeth $e^2$ and upon the upper surface $e$ of the casting E, producing great stability and evenness of movement.

Referring to Figs. II, V and VI, Q designates trunnions or a trunnion mounting for the bearing V for the worm C. Figs. V and VI show the preferred construction of this bearing. $v$ designates a casing, through which the outer end of the worm passes. Arranged within the casing is an anti-thrust device W, comprising rollers W′. $v'$ is a combined cover and bearing suitably secured to the casing as by bolts and nuts. As shown, the rollers W′ are provided with spherical faces and anti-thrust blocks Y, Y′ are arranged on each side of these rollers to permit the faces thereof to come into contact therewith. Any suitable means of securing and offering proper resistance to these anti-thrust devices Y and Y′ may be employed. As shown, the anti-thrust block Y abuts against a turned-in portion of the casting of the casing and the anti-thrust block Y′ against the combined bearing block and cover $v'$. It is our intent that when the devices are running normally and without any undue pressure in any direction, the rollers shall have freedom of movement. If an end thrust comes in either direction, the rollers W′ will be forced hard against one of the anti-thrust devices Y or Y′, thus taking up the end thrust in that direction.

Referring now to Figs. XI and XII, T is a brass drum keyed to a shaft P but insulated therefrom. Keyed to this same shaft P is a worm wheel $p$, which is engaged by a worm $c$ on the davit worm shaft C. As indicated in Fig. IV, the pitch of the worm $c$ is very much finer than that of the main worm C. For example, in actual practice, on the main worm we have used a pitch of from three-quarters of an inch up, depending upon the conditions to be met. A pitch of one-eighth of an inch will probably suffice for the auxiliary worm $c$. Consequently, as the main shaft revolves in a positive direction, it will drive its metallic drum in one direction and when the main shaft is reversed, it will drive the metallic drum in the reverse direction. As shown, particularly in Fig. XI, each metallic drum is provided with two pieces of insulating material $t$ $t'$ respectively. As will be pointed out more fully hereinafter in describing the electric connections, the main drum shaft, the worm C, the auxiliary worm $c$ and the respective pitches of these worms, and also the number of teeth in the worm wheel will be proportioned and arranged so that:— when the davit arm reaches its extreme position in one direction, the insulating piece $t$ will reach a point directly beneath that brush contact between which and the metallic surface of the drum has closed the armature switch controlling the motion of the davit in that direction; and when the davit reaches its extreme position in the opposite direction, the insulating piece $t'$ will reach a point directly beneath the other brush which in a similar way controls the motion of the davit in that direction.

It will be obvious from a study of Fig. II that when the davit A has the upper end of its davit arm proper $a$ directly above position 3, it will be closer to the deck than when in its intermediate position or over the boats marked 1 and 2, and also that by merely stopping the davit at the proper moment, the ropes connected thereto can be made to drop perpendicularly over any desired point of the total scope of movement of the outer end of the davit arm. Obviously, as the distance from the top of the davit arm to each boat when on the deck will always be different, it is necessary to have some contrivance to permit of varying the length of the rope. Furthermore, as the boats on a ship may be a considerable distance from the water, it will be necessary, after the same has been raised and swung outboard by the movement of davit, to lower the same and to rehoist the same. Consequently, we have provided what we shall call a "hoisting drum" adapted to be operated independently of the worm which controls the movement of the davit, and which will not only permit the movement of lowering and hoisting to any extent desired, but will also permit of the length of the rope intermediate the upper end of the davit arm proper and the object to be lifted to be altered at will.

Referring to Fig. III, B designates a boom connecting the upper or outer ends of the davit arms proper $a$ $a$. This boom may be secured to the davit arm in any suitable manner, but we have indicated our preferred method of securing it in Figs. VII and VIII, where we have shown in the upper end of each davit arm $a$ $a$, a pocket $a^5$. The davit arms are preferably hollow castings, as shown. The ends $b$ of the boom, which is also preferably hollow, pass through apertures in the wall of the casting of the davit arms and into the pocket $a^5$. $b^1$ indicates a fastening bolt passing down through the upper and lower walls of the pocket $a^5$ and also through an aperture in the end $b$ of the boom. $b^2$ and $b^3$ are nuts or a head and nut for securing and maintaining the parts in operative position. Secured to each boom at its lower surface in any suitable manner are two or more pulleys or sheaves. Where our apparatus is to be used for boats, it will be preferable to support one end of each boat from a separate pulley. Consequently, at least two pulleys should be secured to the boom in most instances. Under any conditions where boats of varying lengths are to be raised and lowered, or where for any other reason it will be unsatisfactory to have a constant distance between two pulleys, the pulleys may be adjustable longitudinally with regard to the boom, or, as shown, and as preferred for this class of work, two or more sets of pulleys will be secured to the boom. For example, as illustrated in Figs. III and VII, we have shown two sets of pulleys, namely F F and $F^1$ $F^1$. While the pulleys may be secured to the boom in any suitable manner, we prefer to have them connected thereto as indicated in Fig. VII by having them loosely mounted on lugs G $G^1$, which lugs are in turn rigidly secured to the boom. This will permit the pulleys to swing clear of the boom as the davit comes over and prevent the possibility of the ropes fouling or being forced off the sheaves. Where two or more sets of pulleys are used, it is preferable to have the upper ropes running over the same wound around separate hoisting drums. The hoisting drums for each davit may be actuated each by its own motor, or, preferably alternately by the same motor. Where we only have two sets of pulleys, as shown in Fig. III, we have, as shown, two hoisting drums H $H^1$, which will be alternately actuated by a common motor. Any well known means of throwing the motor into gear with first one drum and then another may be utilized.

As shown in Figs. II, III, VII and VIII, the ropes in passing from the winding drum to the boat or other object to be lifted are each secured at one end to their respective winding drums, thence pass upward over what we shall call a guiding sheave or pulley J, thence around their respective pulleys F $F^1$ down around an attaching pulley K $K^1$ and back to a suitable point of attachment on their respective pulleys F $F^1$. The number of sets of pulleys F $F^1$ will determine the number of hoisting drums and also the number of guiding pulleys J. Each hoisting rope should preferably have its independent guiding pulley, and, as illustrated in Fig. VIII, this may be accomplished by using what is known as a double sheave $j$ $j^1$, or by using a plurality of separate sheaves for this purpose. The same is true of the lower guiding pulley or pulleys $J^1$ which may be secured to the frame or deck in any suitable manner and at any point intermediate the drum and upper guiding pulley J.

In Fig. III, we have illustrated two sets of motors, first what we shall call the main motors M $M^1$ for actuating the davit, and the other $m$ $m^1$ for actuating the hoisting drums. It will be noticed that there is absolutely no mechanical connection between the operating mechanisms of the two davits or between the winding drums at opposite ends of the structure. We prefer to have our davits start simultaneously and move at the same rate of speed and stop simultaneously. It is also important that each davit should have a definite limit of movement in either direction. In other words, if for any reason one davit should get somewhat ahead of the other during the course of movement of the entire structure it is essential that each davit at the end of its movement should be in the same position as the other. We will describe later how by the preferred system of wiring and electrical connections we arrange to have our principal motors mechanically independent of each other, started simultaneously, driven at approximately equal speed and yet automatically stopped, each at its extreme position, independently of what may be the position of the other davit. When we come to the hoisting drums and the hoisting motors $m\ m^1$ we have a different set of conditions and different results to be desired. Here again we desire to have the hoisting motors connected with and operated by the same circuit, but we desire to be able to vary the speed of both these motors $m\ m^1$ at will and finally to be able to vary the speed of one thereof without changing that of the other. One end of a boat, for example, may be very much heavier than another. In this case, the heavier end of the boat will put a greater strain on the rope supporting that end, resulting in a distinct stretching of the rope and additional lowering of that end of the boat. Consequently, if the boat is being lowered the motor controlling the hoisting drum at that end should be slowed down until the other end reaches the same level, or the speed of the hoisting drum at the higher end of the boat should be accelerated. In raising under similar conditions, the process would obviously be reversed.

Turning now to Fig. XI, which is a diagrammatic view of our preferred method of wiring, we will first take up the circuit which controls the main motors $M\ M^1$. 10 and 11 designate respective positive and negative wires leading to a suitable source of supply. 100 designates the main switch which may be located at any suitable point. In tracing the circuits, we shall assume in future that this switch is closed. Starting with the positive wire 10 current passes through switch 100, through the line 12, thence through the line 14, thence up the line 16 through the solenoid SS102, thence up the line 18 to the starting switch 104 which is shown as being in contact for the positive rotation of the worm. From this starting switch 104 the current passes through the line 20, thence to the line 22, and thence right and left through the lines 24 and 26 respectively, and thence through the solenoids SS106 and SS108, thence up through the lines 28 and 30 respectively into the brushes 32 and 34 respectively, through the metal drums T T and up through the other brushes 51 and 53 respectively to the common line 29, down through the line 27 to the junction point 25, thence through the line 23 to the line 21, 17 to the junction point 15, down through the line 13 and across the negative side 101 of the main switch, and back to the main negative line 11. It will be noted that the current in passing through this circuit has first energized the solenoid SS102 thereby closing its switch 400, and second has also energized the solenoids SS106 and SS108 thereby closing their respective switches 114 and 116. The result of this first action in closing the solenoid switch 400 is to complete the shunt field, the circuit being from the positive line 10 across the positive side of the main switch 100 through the wire 12, thence through the wires 14 and 16 across the solenoid switch 400, through the line 36, through the shunt field 38 to the negative side of the shunt field 19, back through the lines 17, 15 and 13 to the negative side of the main switch 101 and back to the main negative line 11. The second action in closing the solenoid switches 114 and 116 results in sending a current through the armatures of the main motors $M\ M^1$ respectively and in a positive direction or from the positive to the negative line. These solenoid switches 114 and 116 closed, the current starts with the positive main line 10 across the switch 100, up the line 40 through the starting resistance R and the solenoid 500, line 42, to the junction point 44, through the line 46 to the junction point 48, thence right and left through the solenoid switches 114 and 116 respectively and through the armatures of the motors $M^1\ M$, through the lines 50 and 52, and back through the lower branch of the switches 114 and 116 to the line 53, thence down through junction point 15 and line 13 to the negative side of the main switch and through the negative side of the main switch 101 to the negative main line 11. If the starting switch 104 is thrown in contact with the other contact point 105, the solenoids SS110 and SS112 will be energized instead of the solenoids SS106 and SS108, thus reversing the direction of the current through the main armature of the main motors $M\ M^1$ and thus reversing the direction of the said motors and consequently the direction of rotation of the worm.

We have already described the construction and operation of the metallic drums T T and stated that each had arranged in its periphery two pieces of insulating material $t$ and $t^1$ respectively. The brushes 31 and 33 leading back to the negative line are always in contact with the metallic surface of the drum. The moment the positive brushes 32 or 34 strike the insulating strips $t\ t$, the armature circuit is broken for that motor and the motor will consequently stop. The same statement is true with regard to the reverse brushes 51 and 53 and the insulating strips $t^1\ t^1$. In other words, these insulating strips are so arranged on the metallic drums T that when the davit reaches its extreme position in either direction the brush which must be in contact with the metallic surface of the drum to maintain the circuit will strike the insulating material, thus breaking the circuit which controls the armature switches, thus allowing them to drop and shut off power and prevent any further movement of the motor. Consequently, under normal conditions both main motors will start simultaneously, will proceed at substantially the same speed, and normally will come to a stop approximately simultaneously.

Turning now to the motors for the hoisting drums, we find them designated $m\ m^1$ in Fig. XI. Here we have again a starting switch designated 200. As indicated in the drawing, to hoist, the switch is thrown into contact with point 201, and, to lower, with point 202. Taking up the hoisting operation first, the current again passes from positive line 10 across the main switch 100, through lines 12, 14 and 16, thence line 218 and through the solenoid SS220, through line 222, through the starting switch 200, line 224, to the solenoids SS226 and SS228, through line 230 down to the junction point 225, through the line 223, junction point 221, through lines 219 and 217 back to the line 13 across the negative side of the main switch 101 back to the main negative line 11. By closing this circuit, two results have been produced. In the first place, the solenoid switch 220 has been closed, and in the second place, the two solenoid switches 236 and 238 have been closed. The first act of closing the solenoid switch 220 produces two separate results. In the first place, it connects up the rheostat $200^b$, and in the second place, it completes the shunt fields SF215 and 240. The second action of closing the solenoid switches 236 and 238 throws the current through the armatures of the hoisting motors $m\ m^1$ respectively.

An inspection of the illustration of the switch 200 will show that there is a piece of insulation $200^c$ intermediate the point of connection of the positive line 222 and the lower end of the switch, which lower end $200^d$ will always be in contact first with a short segment 300 and second with a longer segment 301. So long as the solenoid switch 220 is deënergized no circuit will be closed as a result of the contact between the segments 300 and 301, formed by the bar $200^d$. So soon as the solenoid switch 220 is closed, however, the current will pass across the main switch 100, through the lines 12, 14, 16, 218 and 302, through the long segment 301 across the bar $200^d$, through the segment 300, through the line 304, through the shunt fields SF215 and 240 down to the line 223 back through the lines 221, 219 and 217 across the negative side of the switch 101 and back to the main negative line 11. Furthermore, the current will pass across the main switch through the positive lines 12 and 14 to the junction point 306, through the starting resistance $R^1$, through the solenoid 500, line 308, past the junction point 309 through the line 310, through the lines 312 and 314, across the solenoid switches 238 and 236, through the armatures of the hoisting motors $m^1$, $m$, back through the lower branches of the solenoid switches 238 and 236, through the lines 313 and 311 to the junction point 221, and thence back to the negative main line 11. If the switch 200 is thrown into contact with the lower contact point 202, the solenoids SS240 and SS242 will be energized and the direction of the current reversed—thus reversing the direction of the motors and hoisting drums.

Returning again for a moment to the segments 300 and 301 and the connecting bar $200^d$, we have here a rheostat which will permit of a variation of the amount of resistance thrown into the shunt field circuit, or in other words which will determine the potentiality of the current thrown over the shunt field, thus permitting an increase in the speed of both the hoisting motors. 400 designates another switch which may be closed to weaken the shunt field of one of the motors only. For example, when this switch 400 is closed, the shunt current will pass through the shunt field SF215 of the hoisting motor $m$ and to the junction point 246 where it will divide,—part going through the shunt field 240 and directly down to the negative line 223 and the rest up the line 402 to the switch 400, down through the line 404, through the resistance $R^2$, and thence through the line 406 back to the negative line 223. The addition of this resistance $R^2$ will increase the speed of the armature of the motor $m^1$, thus creating a variance in speed between the two hoisting motors and hoisting drums. This additional resistance should be applied to the slower of the two motors which can be tested out before attachment to find out which is the slower under a given current.

Referring now to the starting resistances R $R^1$ (Fig. XI), each is shown as of the same construction. Any form of resistance device which, after the circuit through the armature has been closed, will automatically cut out the resistance may be employed.

In Fig. XI, $R^1$ designates the starting resistance in its starting position. R designates the same with the resistance cut out. So long as the main circuit through the armature in either case is closed, the solenoid 500 becomes energized, draws up the iron core 501 changing the contact point from the position shown at $R^1$ to that shown at R. 502 designates a dashpot in order to insure a gradual upward movement and consequent gradual cutting out of the resistance.

Having described our invention, what we claim and desire to secure by Letters Patent, is

1. The combination of a davit, a track to support it, a nut mounted pivotally in the davit, a frame joined with the track, a casing mounted on trunnions in the frame, a worm-shaft projecting with both ends through the casing and threaded into the nut, an end-thrust bearing and a radial bearing for the worm, both said bearings being contained within the casing, and means for rotating the worm.

2. The combination of a davit, a track to support it, a nut mounted pivotally in the davit, a frame, a bar above the nut fastened to the frame and arranged to be in contact with the nut laterally but not vertically, a casing mounted on trunnions in the frame, a worm shaft projecting with both ends through the casing and threaded into the nut, a thrust bearing and a radial bearing for the worm, both of said bearings being contained within the casing, and means for rotating the worm.

3. The combination of two davits arranged to move in a vertical plane, each davit having a pocket at its top, a boom having ends mounted in said pockets, a bolt secured in a vertical direction through the top of each davit and through each end of the boom.

4. The combination of two davits arranged to move in a vertical plane, each davit having a pocket at its top, a boom having its ends mounted in said pockets, a bolt secured in vertical direction through the top of each davit and through each end of the boom, means mechanically independent of each other for imparting motion to the davits at approximately equal speeds, and electro-magnetically operated automatic means for stopping each davit at its extreme position in each direction.

5. The combination of two davits, two electric motors mechanically independent of each other, and arranged each one to move a davit in a vertical plane, a starting resistance in common for both motors, an operating switch and electro-magnetic means for closing simultaneously the field circuits of both the motors and for starting or reversing both of the motors and electro-magnetically operated means for automatically stopping one davit at each of its extreme positions independently of the position of the other davit.

6. The combination with a pair of davits for handling a boat, of two motors arranged each one for moving a davit in a vertical plane, a boom loosely bolted to the tops of both davits, a sheave suspended from the boom, a rope arranged to run over the sheave and to be connected to the boat, a motor and connection between the motor and the rope, an operating switch and electro-magnetic means for starting simultaneously both of said first motors; automatic means for stopping one of said motors at each of its extreme positions, and an operating switch for controlling the speed of the said latter motors.

7. The combination with a pair of davits for handling a boat, of two motors arranged each one for moving a davit in a vertical plane, a boom loosely bolted to the tops of both davits, two sheaves suspended from lugs rigidly secured to the boom, a rope arranged to run over the said sheaves and to be connected to the boat, a motor and connection between the motor and the rope, an operating switch and electro-magnetic means for starting simultaneously both of said first motors, automatic means for stopping one of said motors at each of its extreme positions, and an operating switch for controlling the speed of the latter motor.

8. A pair of electrically operated davits for manipulating a boat, comprising two independent electric motors for moving the davits in a vertical plane, an operating switch having an open, a forward, and a reverse position, electro-magnetic means actuated through said operating switch for controlling the movement of said motors, automatic electro-magnetic means for stopping one davit at its extreme position independently of the position of the other davit, pulleys and sheaves connected with the davits, ropes arranged to be fastened to the boat and guided by the pulleys, two independent electric motors, connection between the motors and the ropes, and means for controlling the speed of said latter two motors.

9. In apparatus for manipulating life boats, the combination of two davits, an electric motor arranged to cause movement in a vertical plane of one davit independently of the other davit, an operating switch and electro-magnetic apparatus for controlling said movement of both davits, automatic electro-magnetic apparatus for stopping said movement of either one of said davits at its extreme position independently of the position of the other davit, pulleys, ropes guided by pulleys and arranged to be fastened to the life boat, and means for winding the rope.

10. The combination of two davits for manipulating a life boat, a boom bolted loosely to the tops of both davits, so as to join the davits and to permit relative variation in their movement in a vertical plane, an independent motor and mechanism for moving each davit in a vertical plane, means for controlling the speed of said motors, sheaves and pulleys fastened to the davits and to the boom, ropes guided by said sheaves and pulleys and arranged to be fastened to the life boat; two motors arranged to wind the ropes, means for controlling and varying the speeds of said latter motors, and means for varying the speed of one of said latter motors independently of the speed of the other motor.

11. The combination of a davit arranged to move in a vertical plane, a frame therefor, a nut mounted pivotally in the davit, a bearing mounted pivotally in the frame, a worm shaft journaled in the bearing and threaded in the nut, means for rotating the worm shaft, and means for sustaining end thrust from the worm shaft.

12. In a vertically swinging davit, the combination with a rack provided with two sets of teeth separated by a space, of two tracks arranged respectively on the outside of each set of teeth and having their pitch line raised above that of the rack, a segment provided at the lower end of the davit and having two sets of teeth adapted respectively to engage with the teeth on the rack, an intermediate track on the segment and arranged between its two sets of teeth and adapted to project down through the space between the two sets of teeth on the rack, and two outside tracks arranged on the segment and adapted to engage with the outside tracks on the rack.

13. The combination of two davits arranged to move in a vertical plane, and on each side of another vertical plane at right angles thereto and intersecting the base, a boom connecting the upper ends of said davits, means for imparting motion to said davits in opposite directions, pulleys secured to said boom, a device to be manipulated by said davits, ropes running through said davits and connected to said device, and means for insuring the clearing of the ropes from said boom as the davits and boom swing across said vertical plane extending upward between and from the base of said davits.

14. The combination of a davit arranged to move in a vertical plane, a frame therefor, a worm shaft journaled at one end in a suitable bearing in the frame and free at its other end, a nut carried by the davit and threaded on the worm, and means for sustaining end thrust from the worm.

15. The combination of a davit arranged to move in a vertical plane, a frame therefor, a worm shaft for moving said davit journaled at one end of said frame, a nut mounted pivotally in the davit and threaded on the worm, and means for sustaining thrusts from the worm comprising a casing pivotally mounted in the frame and anti-thrust devices contained within the casing.

In witness whereof, we have hereunto subscribed our names in the presence of two subscribing witnesses.

GUSTAF RENNERFELT.
ANDREAS P. LUNDIN.

Witnesses:
   Jos. F. O'Brien,
   Rose V. Finn.